(12) United States Patent
Zhang

(10) Patent No.: US 8,661,306 B2
(45) Date of Patent: Feb. 25, 2014

(54) BASEBOARD MANAGEMENT CONTROLLER AND MEMORY ERROR DETECTION METHOD OF COMPUTING DEVICE UTILIZED THEREBY

(75) Inventor: Yu-Gang Zhang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 565 days.

(21) Appl. No.: 12/976,967

(22) Filed: Dec. 22, 2010

(65) Prior Publication Data

US 2012/0117429 A1    May 10, 2012

(30) Foreign Application Priority Data

Nov. 9, 2010  (CN) .......................... 2010 1 0536514

(51) Int. Cl.
*G06F 11/00* (2006.01)
(52) U.S. Cl.
USPC .......................................................... 714/748
(58) Field of Classification Search
USPC .......................................................... 714/748
See application file for complete search history.

(56) References Cited

U.S. PATENT DOCUMENTS

| 7,437,258 | B2 * | 10/2008 | Robertson et al. | 702/106 |
|---|---|---|---|---|
| 7,552,359 | B2 * | 6/2009 | Takemori | 714/11 |
| 7,783,877 | B2 * | 8/2010 | Lu | 713/2 |
| 8,417,774 | B2 * | 4/2013 | Flynn et al. | 709/204 |
| 8,549,277 | B2 * | 10/2013 | Tang | 713/100 |
| 2004/0267483 | A1 * | 12/2004 | Percer et al. | 702/118 |
| 2005/0021260 | A1 * | 1/2005 | Robertson et al. | 702/75 |
| 2007/0088988 | A1 * | 4/2007 | Gupta et al. | 714/48 |
| 2012/0166864 | A1 * | 6/2012 | Zhang | 714/2 |
| 2013/0212311 | A1 * | 8/2013 | Hunsaker et al. | 710/110 |

* cited by examiner

*Primary Examiner* — Amine Riad
(74) *Attorney, Agent, or Firm* — Altis Law Group, Inc.

(57) ABSTRACT

A method detects a memory error of a computing device using a baseboard management controller (BMC) of the computing device. The BMC includes a microprocessor and a storage system. The method reads data of a state register of a processor of the computing device when the microprocessor receives an interrupt signal generated by the processor due to an internal error of the processor. Then the method determines whether the internal error is a multiple-bit error of a memory of the computing device according to the read data. Upon the condition that the internal error is the multiple-bit error, the method records error information of the multiple-bit error in the storage system.

15 Claims, 3 Drawing Sheets

BASEBOARD MANAGEMENT CONTROLLER AND MEMORY ERROR DETECTION METHOD OF COMPUTING DEVICE UTILIZED THEREBY

BACKGROUND

1. Technical Field

Embodiments of the present disclosure relate generally to data error detection technology, and more particularly, to a memory error detection method of a computing device using a baseboard management controller (BMC) of the computing device.

2. Description of Related Art

Memory error often occurs during data transmission of a memory of a computing device. A memory controller may be integrated in a processor of the computing device, such as a network server. When a multiple-bit error of the memory occurs, the processor and a basic input output system (BIOS) of the computing device may stop operating because of an internal error of the processor. Therefore, the multiple-bit error may not be detected by reading state information of a north bridge chip of the computing device through the BIOS, which causes the multiple bit error to not be handled in time.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
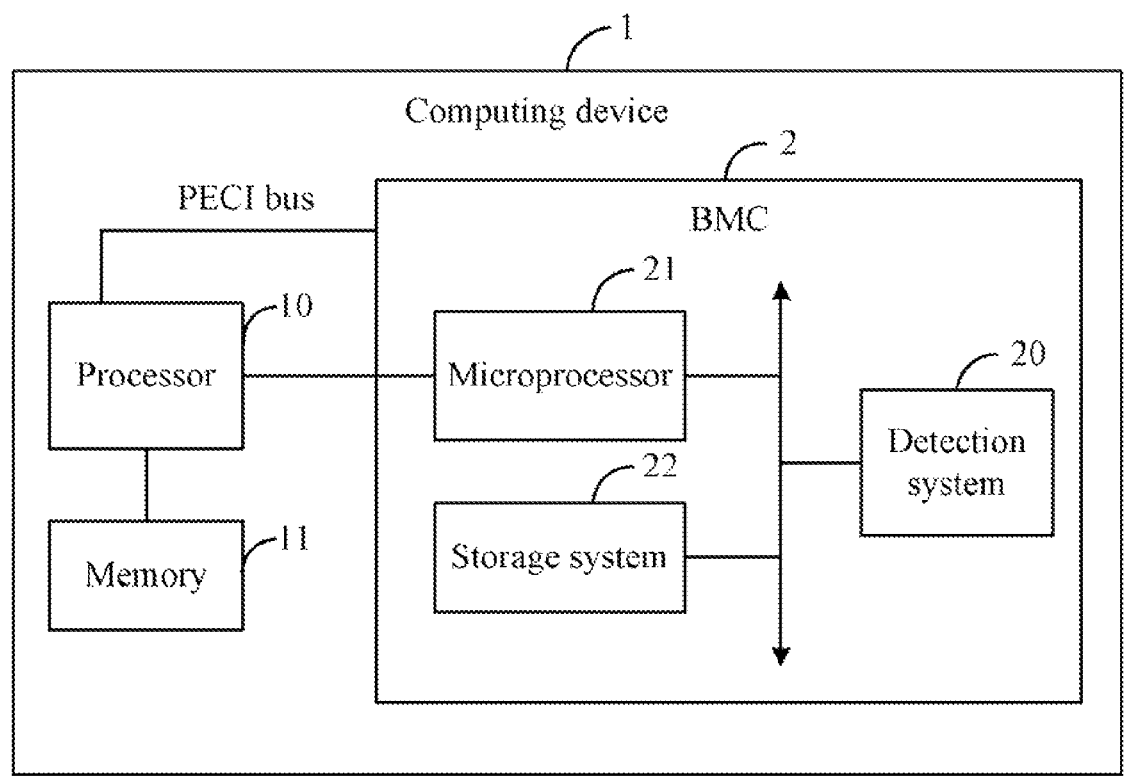
FIG. 1 is a block diagram of one embodiment of a computing device.

FIG. 1 is a block diagram of one embodiment of a computing device 1. In the embodiment, the computing device 1 includes at least one processor 10, at least one memory 11, and a baseboard management controller (BMC) 2. In the embodiment, one processor 10 and one memory 11 are shown in FIG. 1 for convenient description of the disclosure. The processor 10 is electronically connected with the BMC 2 through a platform environment control interface (PECI) bus. In one embodiment, the computing device 1 may be a computer, a server, or other hardware device. The processor 10 executes computerized operations of the computing device 1 and other applications, to provide functions of the computing device 1. It should be apparent that FIG. 1 is only one example of the computing device 1 that can be included with more or fewer components than shown in other embodiments, or a different configuration of the various components.

In one embodiment, The BMC 2 includes a detection system 20, a microprocessor 21, and a storage system 22. The microprocessor 21 may be a chipset, electronically connected with a general purpose input output (GPIO) interface of the processor 10 to communicate with each other. In one embodiment, when an internal error of the processor 10 occurs, the processor 10 may generate an interrupt signal and send the interrupt signal to the microprocessor 21. The detection system 20 is operable to detect a multiple-bit error of the memory 11 when the microprocessor 21 receives the interrupt signal, details of which are below. As used herein, the multiple-bit error is defined as a data error of two or more bits of the memory 11 that occurs during data transmission of the memory 11.

The storage system 22 stores one or more programs, such as programs of a firmware or other applications of the BMC 2, and executed by the microprocessor 21 to provide functions of the BMC 2. In one embodiment, the storage system 22 may be random access memory (RAM) for temporary storage of information, and/or a read only memory (ROM) for permanent storage of information. In other embodiments, the storage system 22 may also be an external storage device, such as a hard disk, a storage card, or a data storage medium.

Figure 2:
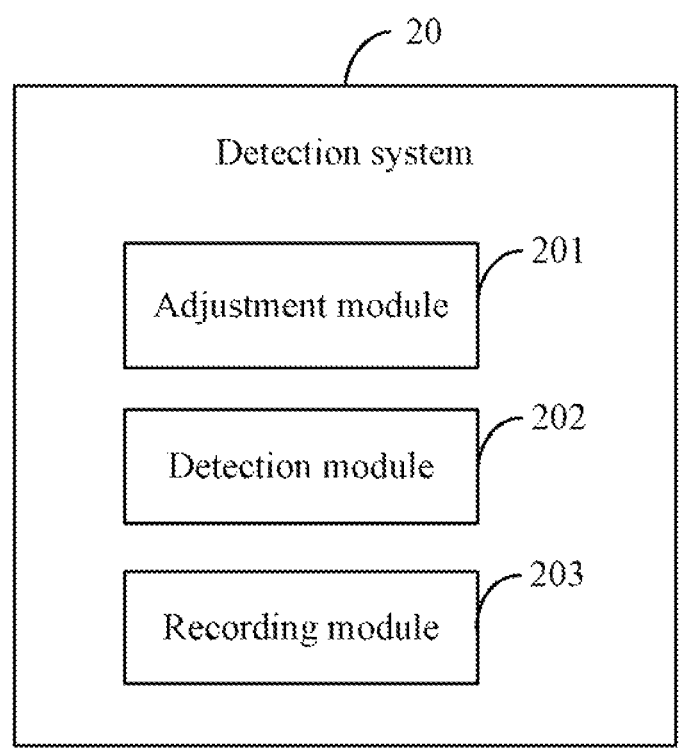
FIG. 2 is a block diagram of one embodiment of functional modules of a detection system of the computing device.

FIG. 2 is a block diagram of one embodiment of functional modules of the detection system 20 of FIG. 1. The detection system 20 may include a plurality of functional modules comprising one or more computerized instructions that are stored in the storage system 22, and executed by the microprocessor 21 to perform operations of the BMC 2. In one embodiment, the detection system 20 includes an adjustment module 201, a detection module 202, and a recording module 203. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The adjustment module 201 is operable to adjust an operating frequency of the microprocessor 21 according to a bus frequency of the PECI bus, and control the microprocessor 21 to communicate with the processor 10 based on the operating frequency.

The detection module 202 is operable to read data of a state register of the processor 10 when the microprocessor 21 receives an interrupt signal generated by the processor 10 due to an internal error of the processor 10, and determine whether the internal error is the multiple-bit error of the memory 11 according to the read data.

The recording module 203 is operable to record error information of the multiple-bit error in the storage system 22 upon the condition that the internal error is the multiple-bit error. In one embodiment, the error information may include, for example, serial numbers of the memory 11, an error type of the multiple-bit error, and time information when the multiple-bit error occurs. Upon the condition that the internal error is not the multiple-bit error, the internal error may be handled by the processor 10 or other components of the computing device 1.

Figure 3:
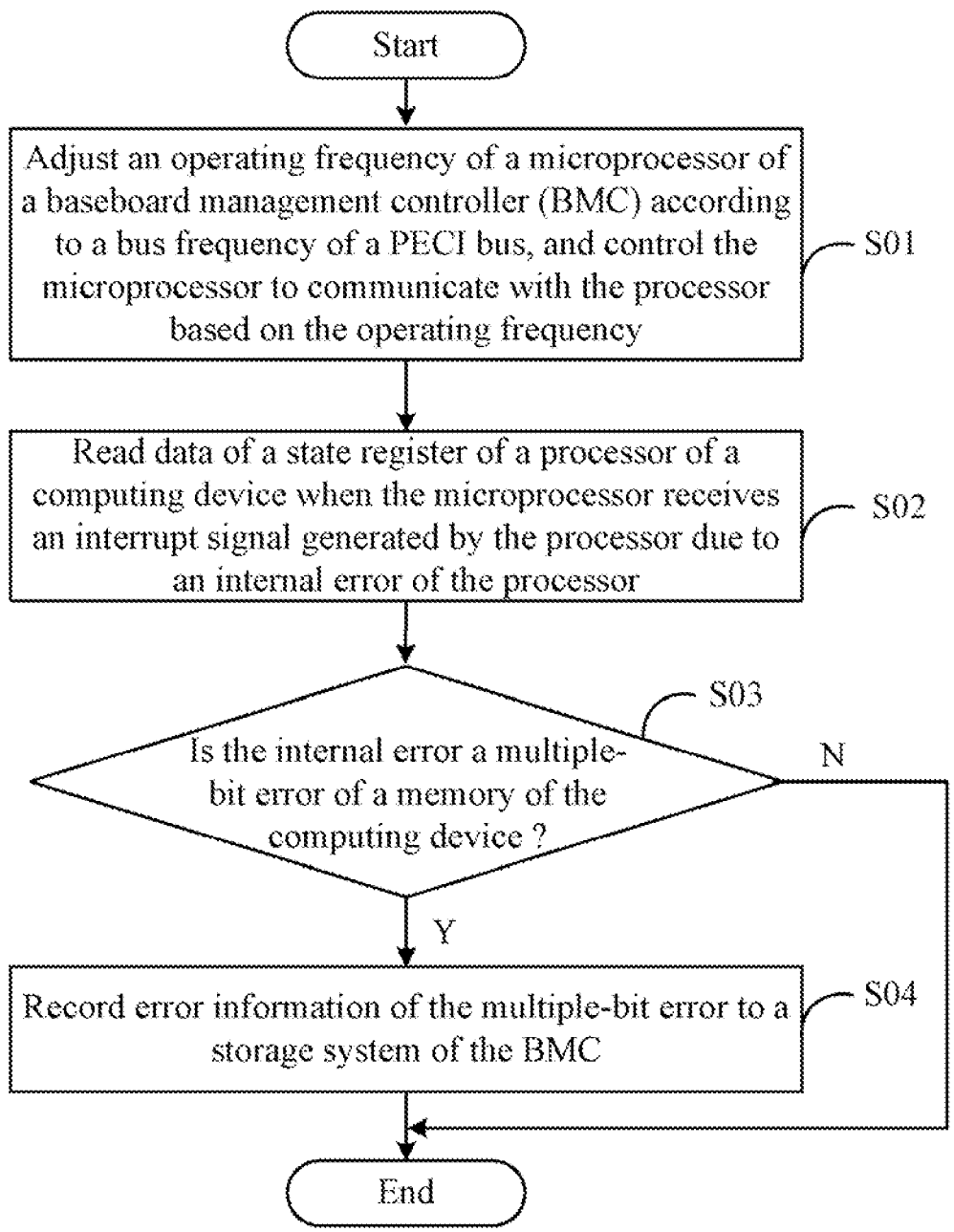
FIG. 3 is a flowchart of one embodiment of a memory error detection method using a baseboard management controller of the computing device of FIG. 1.

FIG. 3 is a flowchart of one embodiment of a memory error detection method of the computing device 1 using the BMC 2 of FIG. 1. Depending on the embodiment, additional blocks may be added, others removed, and the ordering of the blocks, may be changed.

In block S01, the adjustment module 201 adjusts an operating frequency of the microprocessor 21 according to a bus frequency of the PECI bus, and controls the microprocessor 21 to communicate with the processor 10 based on the operating frequency.

In block S02, the detection module 202 reads data of a state register of the processor 10 when the microprocessor 21 receives an interrupt signal generated by the processor 10 due to an internal error of the processor 10.

In block S03, the detection module 202 determines whether the internal error is a multiple-bit error of the memory 11 according to the read data. If the internal error is the multiple-bit error, block S04 is implemented. Otherwise, if the internal error is not the multiple-bit error, ends the procedure.

In block S04, the recording module 203 records error information of the multiple-bit error in the storage system 22. In one embodiment, the error information may include, for example, serial numbers of the memory 11, an error type of the multiple-bit error, and time information when the multiple-bit error occurs.

In one embodiment, the recorded error information may be provided to a basic input output system (BIOS) of the computing device 1 or a user to handle the multiple-bit error. For example, when the computing device 1 is rebooted due to the multiple-bit error, the BIOS may acquire the error information from the storage system 22 to detect the memory 11 of which the multiple-bit error has occurred. Then the BOIS may modify a command of a control register of the processor 10 to control the processor 10 not to access the memory 11 of which the multiple-bit error has occurred. Thereupon, the computing device 1 may be started by accessing the other memory chips of the computing device 1, to avoid the computing device 1 from crashing because of the multiple-bit error. Additionally, the user may acquire the error information using a remote server or a remote computer through a network, and handle the multiple-bit error according to the acquired error information of the memory 11 of the computing device 1.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A memory error detection method of a computing device using a baseboard management controller (BMC) of the computing device, the method comprising:
    adjusting an operating frequency of a microprocessor of the BMC according to a bus frequency of a platform environment control interface (PECI) bus;
    controlling the microprocessor to communicate with a processor of the computing device based on the operating frequency of the microprocessor;
    reading data of a state register of the processor when the microprocessor receives an interrupt signal generated by the processor due to an internal error of the processor;
    determining whether the internal error is a multiple-bit error of a memory of the computing device according to the read data; and
    recording error information of the multiple-bit error in a storage system of the BMC upon the condition that the internal error is the multiple-bit error.

2. The method according to claim 1, wherein the processor is electronically connected with the BMC through the PECI bus.

3. The method according to claim 1, wherein the interrupt signal is sent to the microprocessor through a general purpose input output interface of the processor.

4. The method according to claim 1, wherein the error information comprise serial numbers of the memory, an error type of the multiple-bit error, and time information when the multiple-bit error occurs.

5. The method according to claim 1, further comprising:
    acquiring the error information from the storage system when the computing device is rebooted due to the multiple-bit error;
    detecting the memory of which the multiple-bit error has occurred according to the error information; and
    modifying a command of a control register of the processor to control the processor not to access the memory of which the multiple-bit error has occurred.

6. A computing device, comprising:
    at least one processor;
    at least one memory;
    a baseboard management controller (BMC) comprising a microprocessor and a storage system; and
    one or more programs stored in the storage system and being executable by the microprocessor, the one or more programs comprising:
    an adjustment module operable to adjust an operating frequency of the microprocessor according to a bus frequency of a platform environment control interface (PECI) bus, and control the microprocessor to communicate with the processor based on the operating frequency;
    a detection module operable to read data of a state register of the processor when the microprocessor receives an interrupt signal generated by the processor due to an internal error of the processor, and determine whether the internal error is a multiple-bit error of the memory according to the read data; and
    a recording module operable to record error information of the multiple-bit error in the storage system upon the condition that the internal error is the multiple-bit error.

7. The computing device according to claim 6, wherein the processor is electronically connected with the BMC through the PECI bus.

8. The computing device according to claim 6, wherein the interrupt signal is sent to the microprocessor through a general purpose input output interface of the processor.

9. The computing device according to claim 6, wherein the error information comprise serial numbers of the memory, an error type of the multiple-bit error, and time information when the multiple-bit error occurs.

10. The computing device according to claim 6, wherein the computing device comprises a basic input output system (BIOS) operable to:
    acquire the error information from the storage system when the computing device is rebooted due to the multiple-bit error;
    detect the memory of which the multiple-bit error has occurred according to the error information; and
    modify a command of a control register of the processor to control the processor not to access the memory of which the multiple-bit error has occurred.

11. A non-transitory computer readable storage medium storing a set of instructions, the set of instructions capable of being executed by a microprocessor of a baseboard management controller (BMC) of a computing device, causes the computing device to perform a memory error detection method using the BMC, the method comprising:
    adjusting an operating frequency of the microprocessor according to a bus frequency of a platform environment control interface (PECI) bus;
    controlling the microprocessor to communicate with a processor of the computing device based on the operating frequency of the microprocessor;

reading data of a state register of the processor when the microprocessor receives an interrupt signal generated by the processor due to an internal error of the processor;

determining whether the internal error is a multiple-bit error of a memory of the computing device according to the read data; and recording error information of the multiple-bit error in a storage system of the BMC upon the condition that the internal error is the multiple-bit error.

12. The storage medium as claimed in claim 11, wherein the processor is electronically connected with the BMC through the PECI bus.

13. The storage medium as claimed in claim 11, wherein the interrupt signal is sent to the microprocessor through a general purpose input output interface of the processor.

14. The storage medium as claimed in claim 11, wherein the error information comprise serial numbers of the memory, an error type of the multiple-bit error, and time information when the multiple-bit error occurs.

15. The storage medium as claimed in claim 11, wherein the method further comprises:

acquiring the error information from the storage system when the computing device is rebooted due to the multiple-bit error;

detecting the memory of which the multiple-bit error has occurred according to the error information; and modifying a command of a control register of the processor to control the processor not to access the memory of which the multiple-bit error has occurred.

\* \* \* \* \*